United States Patent
Chen et al.

(10) Patent No.: US 9,491,371 B2
(45) Date of Patent: Nov. 8, 2016

(54) METHOD AND DEVICE FOR CONFIGURING PHOTOGRAPHING PARAMETERS

(71) Applicant: Xiaomi Inc., Beijing (CN)

(72) Inventors: Xiaolong Chen, Beijing (CN); Ling Zhu, Beijing (CN); Lin Liu, Beijing (CN); Yanjiong Wang, Beijing (CN)

(73) Assignee: XIAOMI INC., Haidian District, Beijing (CN)

( * ) Notice: Subject to any disclaimer, the term of this patent is extended or adjusted under 35 U.S.C. 154(b) by 0 days.

(21) Appl. No.: 14/543,909

(22) Filed: Nov. 18, 2014

(65) Prior Publication Data

US 2015/0312458 A1 Oct. 29, 2015

Related U.S. Application Data

(63) Continuation of application No. PCT/CN2014/084461, filed on Aug. 15, 2014.

(30) Foreign Application Priority Data

Apr. 23, 2014 (CN) .......................... 2014 1 0165587

(51) Int. Cl.
*H04N 5/235* (2006.01)
*H04N 5/225* (2006.01)
*G03B 15/05* (2006.01)

(52) U.S. Cl.
CPC ............ *H04N 5/2352* (2013.01); *G03B 15/05* (2013.01); *H04N 5/2256* (2013.01); *H04N 5/2351* (2013.01); *H04N 5/2354* (2013.01); *G03B 2215/0557* (2013.01)

(58) Field of Classification Search
CPC ............ H04N 5/2352; H04N 5/2351; H04N 5/2354; H04N 5/2256; G03B 15/05; G03B 2215/0057
USPC ....................................................... 348/371
See application file for complete search history.

(56) References Cited

U.S. PATENT DOCUMENTS 8,675,124 B2 * 3/2014 Kawakami ............. G03B 15/05
  348/223.1
8,817,128 B2 * 8/2014 Spielberg ............... H04N 9/735
  348/222.1

(Continued)

FOREIGN PATENT DOCUMENTS

CN         1334485 A    2/2002
CN       101803470 A    8/2010

(Continued)

OTHER PUBLICATIONS

"Extended European Search Report for 15159224.3".

(Continued)

*Primary Examiner* — Pritham Prabhakher
(74) *Attorney, Agent, or Firm* — Jun He Law Offices P.C.; James J. Zhu (57) ABSTRACT

The present disclosure discloses a method and a device for configuring photographing parameters, which relate to the field of terminal device technology. The method for configuring photographing parameters in a main device includes: acquiring photographing parameters, which include at least an output color temperature and an output time, for configuring a supplemental device with a flashlight component capable of adjusting color temperature according to a currently set photographing mode; and transmitting the photographing parameters to the supplemental device through a wireless data network, such that the supplemental device sets an output color temperature and an output time of the flashlight component in the supplemental device according to the photographing parameters when photographing. In the present disclosure, the accuracy of the output color temperature of the supplemental device, which supplements light during photographing using multiple terminal devices, is improved, and the quality of the photograph captured is also improved.

12 Claims, 7 Drawing Sheets (56) References Cited

U.S. PATENT DOCUMENTS

| | | | | |
|---|---|---|---|---|
| 2008/0074551 | A1* | 3/2008 | Kawakami | G03B 15/05 348/655 |
| 2010/0322613 | A1* | 12/2010 | Khuntia | G03B 15/06 396/157 |
| 2011/0150451 | A1 | 6/2011 | Kubota | |
| 2012/0026356 | A1* | 2/2012 | Nakagawara | H04N 5/2354 348/223.1 |
| 2012/0262571 | A1* | 10/2012 | Wang | H04N 5/2354 348/135 |
| 2012/0327264 | A1* | 12/2012 | Spielberg | G03B 15/03 348/224.1 |
| 2013/0222627 | A1 | 8/2013 | Earnshaw et al. | |

FOREIGN PATENT DOCUMENTS

| | | | |
|---|---|---|---|
| CN | 102104785 | A | 6/2011 |
| CN | 202486477 | U | 10/2012 |
| CN | 103220431 | A | 7/2013 |
| CN | 103454836 | A | 12/2013 |
| CN | 103473052 | A | 12/2013 |
| CN | 103491288 | A | 1/2014 |
| CN | 103686100 | A | 3/2014 |
| CN | 103973979 | A | 8/2014 |
| DE | 19842367 | A1 | 4/2000 |
| GB | 2482562 | A | 2/2012 |
| JP | 2002116481 | A | 4/2002 |
| JP | 2003233101 | A | 8/2003 |
| JP | 2004069894 | A | 3/2004 |
| JP | 2008167299 | A | 7/2008 |
| JP | 2009033668 | A | 2/2009 |
| JP | 2011221363 | A | 11/2011 |
| JP | 2011232461 | A | 11/2011 |
| JP | 2013017083 | A | 1/2013 |
| JP | 2014033400 | A | 2/2014 |
| WO | 2008/035234 | A1 | 3/2008 |

OTHER PUBLICATIONS

"International Search Report for PCT/CN2014/084461".
International Search Report for PCT/CN2014/084461.
Copy of extended European Search Report for 15159224.3.

* cited by examiner

METHOD AND DEVICE FOR CONFIGURING PHOTOGRAPHING PARAMETERS

CROSS-REFERENCE TO RELATED APPLICATIONS

The present application is a Continuation of International Application No. PCT/CN2014/084461, filed Aug. 15, 2014, which is based upon and claims priority to Chinese Patent Application No. 201410165587.1, filed Apr. 23, 2014, the entire contents of which are incorporated herein by reference.

TECHNICAL FIELD

The present disclosure generally relates to the field of terminal device technology, and more particularly, to a method and a device for configuring photographing parameters.

BACKGROUND

With the development of terminal device technology, smart terminal devices have become increasingly popular. Generally, the smart terminal devices are equipped with a camera and a flashlight component, which adjusts color temperature for light supplementing, to meet various photographing demands of the user.

Currently, a new photographing method needs two or more smart terminal devices to accomplish photographing altogether, so as to achieve the lighting in a professional photography, wherein one of the smart terminal devices is intended to be a main device in charge of photographing, and other smart terminals are intended to be supplemental devices in charge of supplementing light for the main device by turning on their flashlight components. During photographing, the main device, firstly, adjusts the output color temperature of its own flashlight component according to a color temperature of the current environment, and then send a start command to each of the supplemental devices through a wireless data network established in advance. At this time, the supplemental devices will turn on their flashlight components to supplement light for the main device.

SUMMARY

Accordingly, a method and a device for configuring photographing parameters are provided by embodiments of the present disclosure. The technical solutions are as follows.

According to a first aspect of embodiments of the present disclosure, there is provided a method for configuring photographing parameters in a main device, including: acquiring photographing parameters, which include at least an output color temperature and an output time, for configuring a supplemental device with a flashlight component capable of adjusting color temperature according to a currently set photographing mode; and transmitting the photographing parameters to the supplemental device through a wireless data network, such that the supplemental device sets an output color temperature and an output time of the flashlight component in the supplemental device according to the photographing parameters when photographing.

According to a second aspect of embodiments of the present disclosure, there is provided a method for configuring photographing parameters in a supplemental device, including: receiving photographing parameters, which include at least an output color temperature and an output time, transmitted from a main device; and setting an output color temperature and an output time for photographing of a flashlight component according to the photographing parameters.

According to a third aspect of embodiments of the present disclosure, there is provided a main device for configuring photographing parameters, including: a processor; a memory for storing instructions executable by the processor, wherein the processor is configured to perform: acquiring photographing parameters, which include at least an output color temperature and an output time, for configuring a supplemental device with a flashlight component capable of adjusting color temperature according to a currently set photographing mode; and transmitting the photographing parameters to the supplemental device through a wireless data network, such that the supplemental device sets an output color temperature and an output time of the flashlight component in the supplemental device according to the photographing parameters when photographing.

According to a fourth aspect of embodiments of the present disclosure, there is provided a supplemental device for configuring photographing parameters, including: a processor; a memory for storing instructions executable by the processor, wherein the processor is configured to: receiving photographing parameters, which include at least an output color temperature and an output time, transmitted from a main device; and setting an output color temperature and an output time for photographing of a flashlight component according to the photographing parameters.

According to a fifth aspect of embodiments of the present disclosure, there is provided a non-transitory readable storage medium including instructions, executable by a processor in a main device, for performing a method for configuring photographing parameters, the method including: acquiring photographing parameters, which include at least an output color temperature and an output time, for configuring a supplemental device with a flashlight component capable of adjusting color temperature according to a currently set photographing mode; and transmitting the photographing parameters to the supplemental device through a wireless data network, such that the supplemental device sets an output color temperature and an output time of the flashlight component in the supplemental device according to the photographing parameters when photographing.

According to a sixth aspect of embodiments of the present disclosure, there is provided a non-transitory readable storage medium including instructions, executable by a processor in a supplemental device, for performing a method for configuring photographing parameters, the method including: receiving photographing parameters, which include at least an output color temperature and an output time, transmitted from a main device; and setting an output color temperature and an output time for photographing of a flashlight component according to the photographing parameters.

The technical solutions provided by the embodiments of the present disclosure may include, in part, the following advantageous effects.

By acquiring a color temperature and an output time in photographing parameters for configuring the supplemental device, an output color temperature and an output time of the flashlight component in the supplemental device are controlled, thereby the accuracy of the output color temperature, which supplements light during photographing using multiple terminal devices, is improved, and the quality of the photographed pictures is improved.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

In order to make the objectives, technical solutions and advantages of the present disclosure more apparent, the embodiments of the present disclosure will be described in further detail with reference to the accompany drawings.

Figure 1:
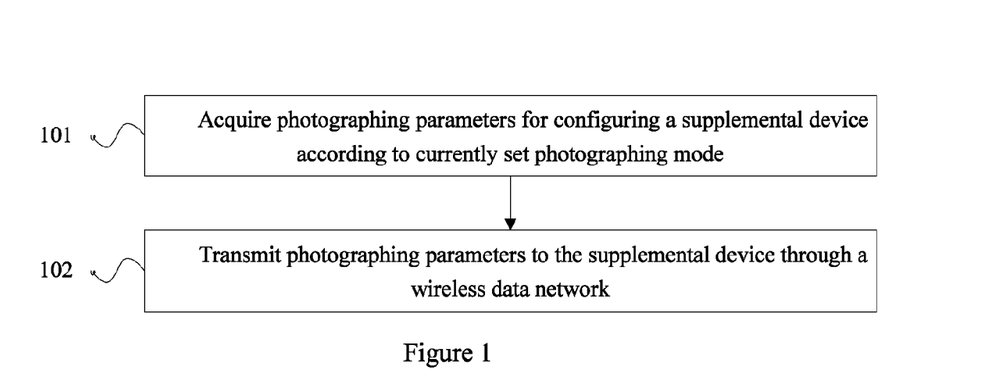
FIG. 1 is a flow chart showing a method for configuring photographing parameters according to an exemplary embodiment of the present disclosure.

The embodiments of the present disclosure provide a method for configuring photographing parameters. Referring to FIG. 1, the method includes the following steps. The method according to this embodiment is performed in a main device.

In step 101, photographing parameters, which include at least an output color temperature and an output time, for configuring a supplemental device with a flashlight component capable of adjusting color temperature are acquired according to a currently set photographing mode.

In step 102, the photographing parameters are transmitted to the supplemental device through a wireless data network, such that the supplemental device sets an output color temperature and an output time of the flashlight component in the supplemental device according to the photographing parameters when photographing. The wireless data network may be a pre-established wireless data network.

In the embodiments of the present disclosure, by acquiring the color temperature and the output time in the photographing parameters for configuring the supplemental device, the output color temperature and the output time of the flashlight component in the supplemental device are controlled, thus the accuracy of the output color temperature of the supplemental device, which supplements light during photographing using multiple terminal devices, is improved, and the quality of the photograph captured is also improved.

Figure 2:
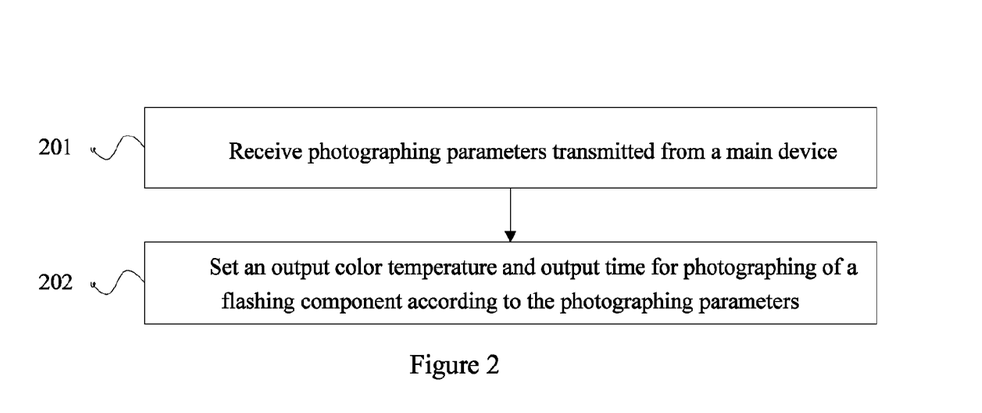
FIG. 2 is a flow chart showing a method for configuring photographing parameters according to an exemplary embodiment of the present disclosure.

The embodiments of the present disclosure further provide a method for configuring photographing parameters. Referring to FIG. 2, the method includes the following steps. The method according to this embodiment is performed in a supplemental device.

In step 201, photographing parameters, which include at least an output color temperature and an output time, transmitted from a main device are received.

In step 202, an output color temperature and an output time for photographing of a flashlight component are set according to the photographing parameters.

In the embodiments of the present disclosure, by receiving the color temperature and the output time in the photographing parameters for configuring the supplemental device itself, the output color temperature and the output time of the flashlight component in the supplemental device are controlled, thus the accuracy of the output color temperature of the supplemental device, which supplements light during photographing using multiple terminal devices, is improved, and the quality of the photograph captured is also improved.

Figure 3:
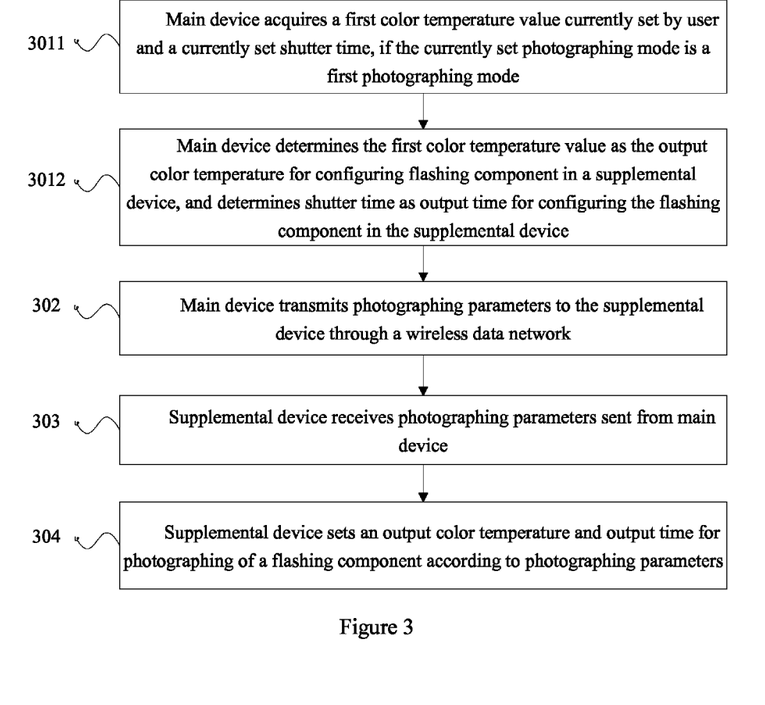
FIG. 3 is a flow chart showing a method for configuring photographing parameters according to an exemplary embodiment of the present disclosure.

The embodiments of the present disclosure further provide a method for configuring photographing parameters. Referring to FIG. 3, the method includes the following steps.

In step 301, a main device acquires photographing parameters, which include at least an output color temperature and an output time, for configuring a supplemental device with a flashlight component capable of adjusting color temperature according to a currently set photographing mode.

Step 301 may be accomplished by the following two steps.

In step 3011, the main device acquires a first color temperature value currently set by a user and a currently set shutter time, if the currently set photographing mode is a first photographing mode.

In the embodiment of the present disclosure, the control of the output temperature is set by the user, which is the first photographing mode. In this photographing mode, the main device does not detect a color temperature of the current environment, and the current color temperature value is set manually by the user during photographing, to meet the demand for creative work by the user.

The process of setting the color temperature by the user may include the following procedure: the output color temperature of the flashlight component in the main device is set through a corresponding option in a photographing interface. In this embodiment of the present disclosure, the output color temperature set by the user is the first color temperature value.

Further, the currently set shutter time may be preset, or may be set by the user, and an acquiring approach of the shutter time is not limited herein.

In step 3012, the main device determines the first color temperature value as the output color temperature for configuring the flashlight component in the supplemental device, and determines the shutter time as the output time for configuring the flashlight component in the supplemental device.

In the first photographing mode, the photographing parameters for configuring the supplemental device include: the first color temperature value and the currently set shutter time, to inform the supplemental device to set the output color temperature and the output time of the flashlight component in the next photographing.

In step 302, the main device transmits the photographing parameters to the supplemental device through a wireless data network, such that the supplemental device sets an output color temperature and an output time of the flashlight component in the supplemental device according to the photographing parameters when photographing.

Wireless signal transmitters are respectively built in the main device and the supplemental devices for wireless communication. Before the main device performs the photographing, the wireless data network is established in advance between the main device and each of the supplemental devices through the wireless signal transmitters. Optional wireless connection manners may include, but is not limited to, Bluetooth or WIFI (Wireless-Fidelity).

In step 303, the supplemental device receives the photographing parameters, which include at least the output color temperature and the output time, transmitted from the main device.

In step 304, the supplemental device sets an output color temperature and an output time for photographing of a flashlight component according to the photographing parameters.

In the embodiments of the present disclosure, by acquiring the color temperature and the output time in the photographing parameters for configuring the supplemental device, the output color temperature and the output time of the flashlight component in the supplemental device are controlled, thus the accuracy of the output color temperature of the supplemental device, which supplements light during photographing using multiple terminal devices, is improved, and the quality of the photograph captured is also improved.

Figure 4:
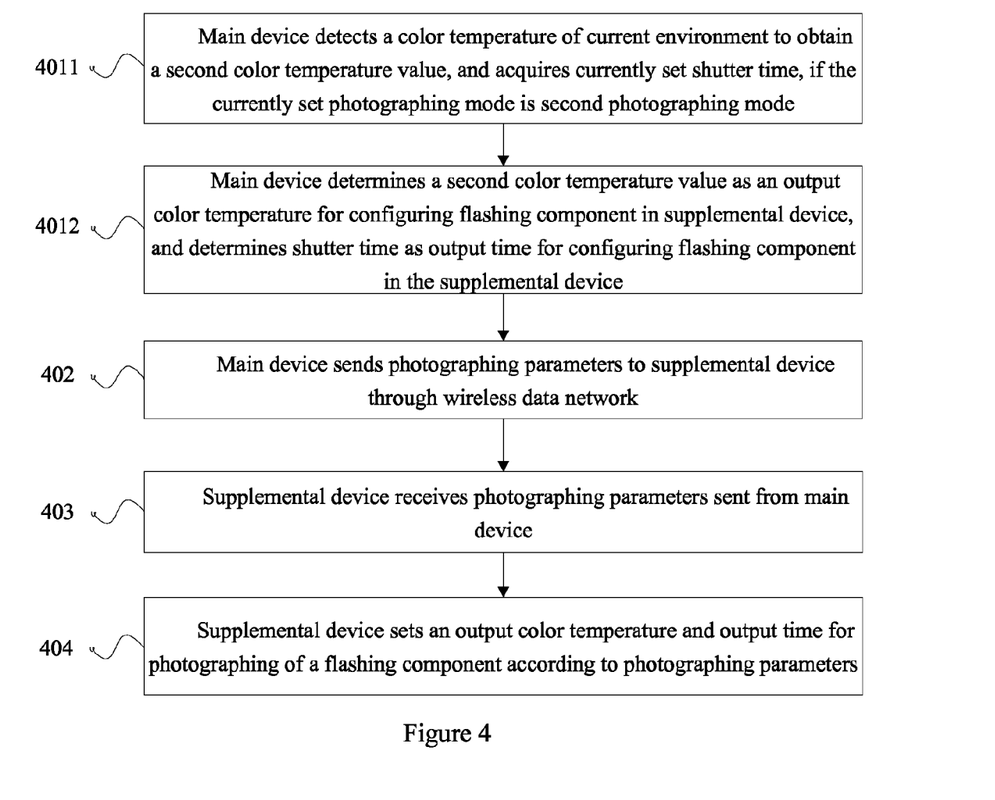
FIG. 4 is a flow chart showing a method for configuring photographing parameters according to an exemplary embodiment of the present disclosure.

The embodiments of the present disclosure further provide a method for configuring photographing parameters. Referring to FIG. 4, the method includes the following steps.

In step 401, a main device acquires photographing parameters, which include at least an output color temperature and an output time, for configuring a supplemental device with a flashlight component capable of adjusting color temperature according to a currently set photographing mode.

Step 401 may be accomplished by the following two steps.

In step 4011, the main device detects a color temperature of current environment to obtain a second color temperature value, and acquires a currently set shutter time, if the currently set photographing mode is a second photographing mode.

In this embodiment of the present disclosure, the control of the output temperature is performed by the main device, which is the second photographing mode. In this photographing mode, the main device detects the color temperature of the current environment through a light sensor contained in the main device itself, and determines the color temperature of the current environment, i.e. the second color temperature value, as an output color for configuring the supplemental device.

Further, the currently set shutter time may be preset, or may be set by the user, and an acquiring approach of the shutter time is not limited herein.

In step 4012, the main device determines the second color temperature value as the output color temperature for configuring the flashlight component in the supplemental device, and determines the shutter time as the output time for configuring the flashlight component in the supplemental device.

In step 402, the main device transmits the photographing parameters to the supplemental device through a wireless data network, such that the supplemental device sets an output color temperature and an output time of the flashlight component in the supplemental device according to the photographing parameters when photographing. The wireless data network may be a pre-established wireless data network.

Wireless signal transmitters are respectively built in the main device and the supplemental devices for wireless communication. Before the main device performs the photographing, the wireless data network is established in advance between the main device and each of the supplemental devices through the wireless signal transmitters. Optional wireless connection manners may include, but is not limited to, Bluetooth or WIFI (Wireless-Fidelity).

In step 403, the supplemental device receives the photographing parameters, which include at least the output color temperature and the output time, transmitted from the main device.

In step 404, the supplemental device sets an output color temperature and an output time for photographing of a flashlight component according to the photographing parameters.

In the embodiments of the present disclosure, by acquiring the color temperature and the output time in the photographing parameters for configuring the supplemental device, the output color temperature and the output time of the flashlight component in the supplemental device are controlled, thus the accuracy of the output color temperature of the supplemental device, which supplements light during photographing using multiple terminal devices, is improved, and the quality of the photograph captured is also improved.

Figure 5:
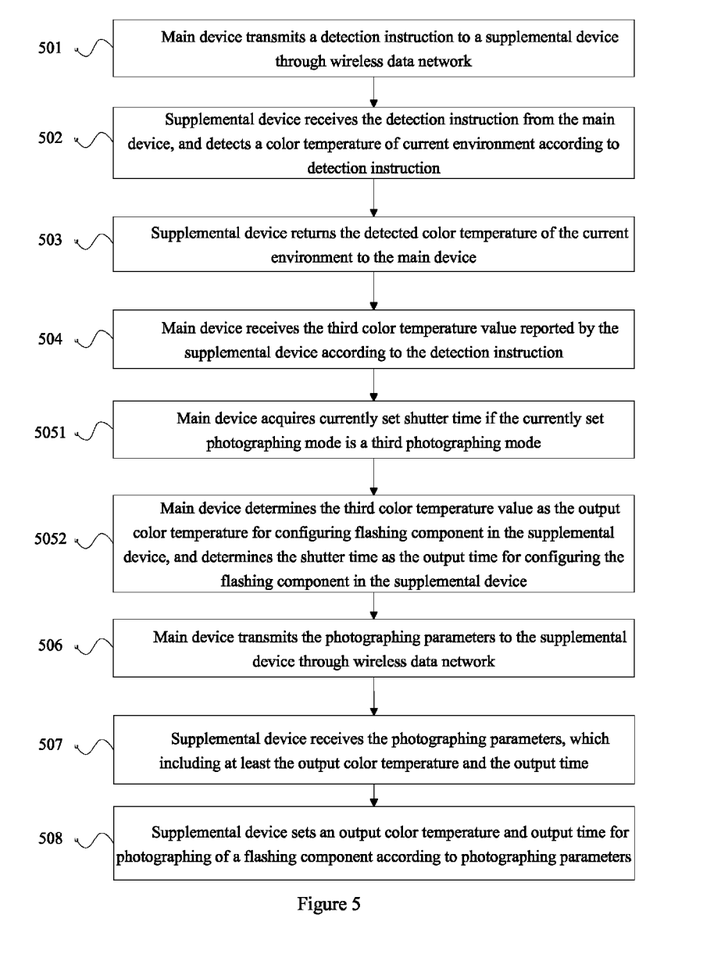
FIG. 5 is a flow chart showing a method for configuring photographing parameters according to an exemplary embodiment of the present disclosure.

The embodiments of the present disclosure further provide a method for configuring photographing parameters. Referring to FIG. 5, the method includes the following steps.

In step 501, a main device transmits a detection instruction to a supplemental device through a wireless data network.

Wireless signal transmitters are respectively built in the main device and the supplemental devices for wireless communication. Before the main device performs the photographing, the wireless data network is established in advance between the main device and each of the supplemental devices through the wireless signal transmitters. Optional wireless connection manners may include, but is not limited to, Bluetooth or WIFI (Wireless-Fidelity).

In step 502, the supplemental device receives the detection instruction from the main device, and detects a color temperature of current environment according to the detection instruction.

The supplemental device detects the color temperature of the current environment through a light sensor contained in the supplemental device to obtain a color temperature value of the current environment, i.e. a third color temperature value.

In step 503, the supplemental device returns the detected color temperature of the current environment to the main device.

In step 504, the main device receives the third color temperature value reported by the supplemental device according to the detection instruction, wherein the third color temperature value is obtained by detecting the color temperature of the current environment by the supplemental device.

In step 505, the main device acquires the photographing parameters, which include at least an output color temperature and an output time, for configuring a supplemental device with a flashlight component capable of adjusting color temperature according to a currently set photographing mode.

Step 505 may be accomplished by the following two steps.

In step 5051, the main device acquires a currently set shutter time if the currently set photographing mode is a third photographing mode.

The currently set shutter time may be preset, or may be set by the user, and an acquiring approach of the shutter time is not limited herein.

In step 5052, the main device determines the third color temperature value as the output color temperature for configuring the flashlight component in the supplemental device, and determines the shutter time as the output time for configuring the flashlight component in the supplemental device.

In this embodiment of the present disclosure, the color temperature of the current environment detected by the supplemental device, i.e. the third color temperature value is taken as the color temperature in the photographing parameters for configuring the supplemental device.

Optionally, when there are two or more supplemental devices, different supplemental devices may be disposed at different locations in the lighting arrangement. Thus, the desirable lighting condition may be complicated, and the supplemental devices at different locations may detect different color temperatures, and report different color temperature values. In order to balance the different color temperatures reported by the supplemental devices, the main device may calculate a weighted average of the reported third color temperature values, to obtain a fourth color temperature value, and determines the fourth color temperature value as the output color temperature for configuring the flashlight component in each of the supplemental devices. Therefore, in step 5052, determining the third color temperature value as the output color temperature for configuring the flashlight component in the supplemental device may further be as follows.

If two or more supplemental devices report the third color temperature values, an average value is calculated according to the third color temperature values reported by each of the supplemental devices, to obtain the fourth color temperature value, and the fourth color temperature value is determined as the output color temperature of the flashlight component in each of the supplemental devices.

In step 506, the main device transmits the photographing parameters to the supplemental device through the wireless data network, such that the supplemental device sets an output color temperature and an output time of the flashlight component in the supplemental device according to the photographing parameters when photographing. The method according to this embodiment is performed in the main device.

In step 507, the supplemental device receives the photographing parameters, which include at least the output color temperature and the output time, transmitted from the main device.

In step 508, the supplemental device sets an output color temperature and an output time for photographing of a flashlight component according to the photographing parameters.

In the embodiments of the present disclosure, by acquiring the color temperature and the output time in the photographing parameters for configuring the supplemental device, the output color temperature and the output time of the flashlight component in the supplemental device are controlled, thus the accuracy of the output color temperature of the supplemental device, which supplements light during photographing using multiple terminal devices, is improved, and the quality of the photograph captured is also improved.

Figure 6:
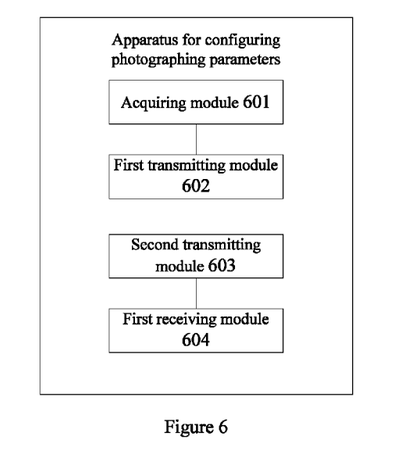
FIG. 6 is a block diagram showing an apparatus for configuring photographing parameters in a main device according to an exemplary embodiment of the present disclosure.

Moreover, the embodiments of the present disclosure provide an apparatus for configuring photographing parameters in a main device. Referring to FIG. 6, the apparatus includes: an acquiring module 601 configured to acquire photographing parameters, which include at least an output color temperature and an output time, for configuring a supplemental device with a flashlight component capable of adjusting color temperature according to a currently set photographing mode; and a first transmitting module 602 configured to transmit the photographing parameters to the supplemental device through a wireless data network, such that the supplemental device sets an output color temperature and an output time of the flashlight component in the supplemental device according to the photographing parameters when photographing.

The acquiring module 601 includes: a first acquiring unit configured to acquire a first color temperature value currently set by a user and a currently set shutter time if the currently set photographing mode is a first photographing mode; and a first configuring unit configured to determine the first color temperature value as the output color temperature for configuring the flashlight component in the supplemental device, and determine the shutter time as the output time for configuring the flashlight component in the supplemental device.

The acquiring module 601 may also include: a second acquiring unit configured to detect a color temperature of current environment to obtain a second color temperature value, and acquire a currently set shutter time, if the currently set photographing mode is a second photographing mode; and a second configuring unit configured to determine the second color temperature value as the output color temperature for configuring the flashlight component in the supplemental device, and determine the shutter time as the output time for configuring the flashlight component in the supplemental device.

The apparatus in the main device further includes: a second transmitting module 603 configured to transmit a detection instruction to a supplemental device through the wireless data network; and a first receiving module 604 configured to receive a third color temperature value reported from the supplemental device according to the detection instruction, wherein the third color temperature value is obtained by detecting a color temperature of current environment by the supplemental device.

Correspondingly, the acquiring module 601 includes: a third acquiring unit configured to acquire a currently set shutter time if the currently set photographing mode is a third photographing mode; and a third configuring unit configured to determine the third color temperature value as the output color temperature for configuring the flashlight component in the supplemental device, and determine the shutter time as the output time for configuring the flashlight component in the supplemental device.

The third configuring unit is configured to: if two or more supplemental devices report the third color temperature values, average the third color temperature values reported from each of the supplemental devices, to obtain a fourth color temperature value, and determine the fourth color temperature value as the output color temperature of the flashlight component in each of the supplemental devices.

In the embodiments of the present disclosure, by acquiring the color temperature and the output time in the photographing parameters for configuring the supplemental device, the output color temperature and the output time of the flashlight component in the supplemental device are controlled, thus the accuracy of the output color temperature of the supplemental device, which supplements light during photographing using multiple terminal devices, is improved, and the quality of the photograph captured is also improved.

Figure 7:
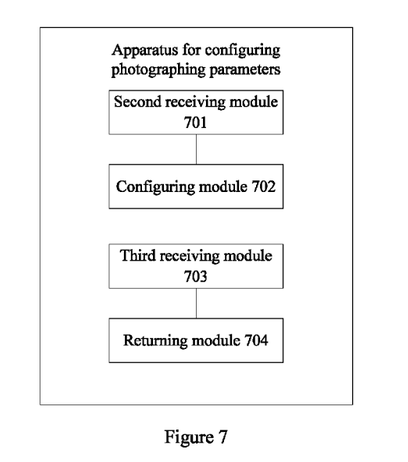
FIG. 7 is a block diagram showing an apparatus for configuring photographing parameters in a supplemental device according to an exemplary embodiment of the present disclosure.

FIG. 7 is a block diagram showing an apparatus for configuring photographing parameters in a supplemental device according to an exemplary embodiment of the present disclosure. Referring to FIG. 7, the apparatus includes: a second receiving module 701 configured to receive photographing parameters, which include at least an output color temperature and an output time, transmitted from a main device; and a configuring module 702 configured to set an output color temperature and an output time for photographing of a flashlight component according to the photographing parameters.

The apparatus in the supplemental device also includes: a third receiving module 703 configured to receive a detection instruction sent from the main device, and detect a color temperature of current environment according to the detection instruction; and a returning module 704 configured to return the detected color temperature of the current environment to the main device.

In the embodiments of the present disclosure, by acquiring a color temperature and an output time in photographing parameters for configuring the supplemental device, an output color temperature and an output time of the flashlight component in the supplemental device are controlled, thus the accuracy of the output color temperature of the supplemental device, which supplements light during photographing using multiple terminal devices, is improved, and the quality of the photograph captured is also improved.

Figure 8:
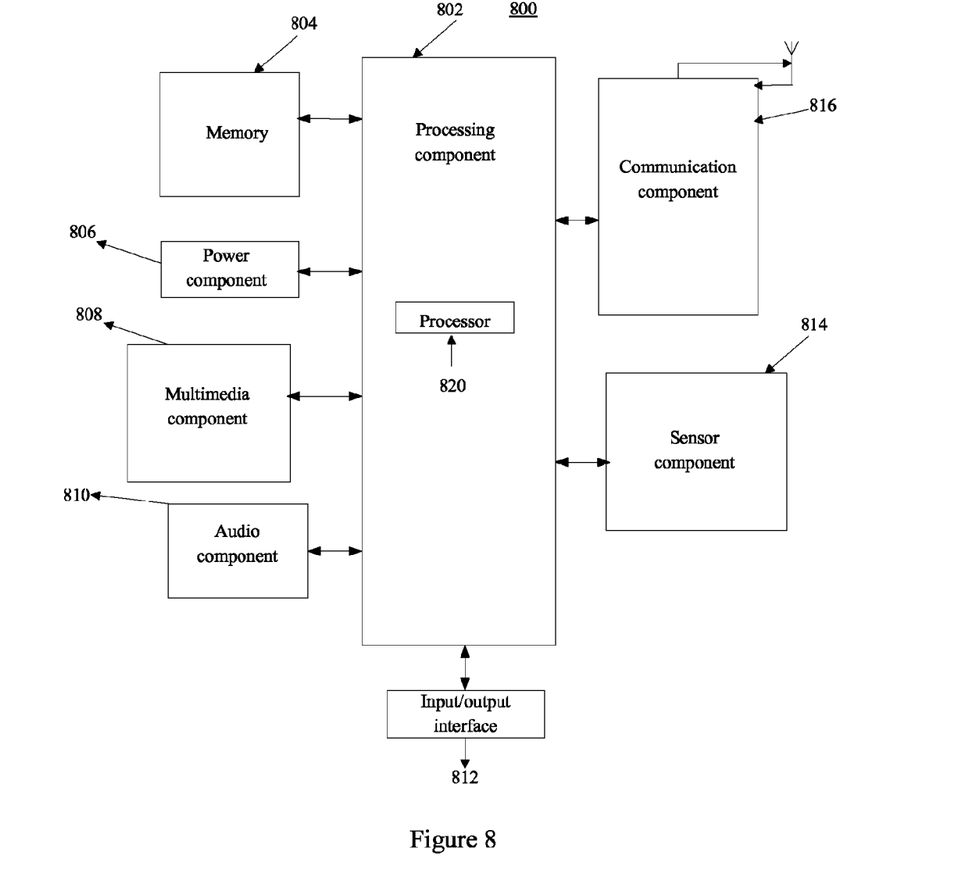
FIG. 8 is a block diagram showing a main device according to an exemplary embodiment of the present disclosure.

The embodiments of the present disclosure provide a main device as shown in FIG. 8, which is a block diagram illustrating the main device according to an exemplary embodiment. For example, the main device 800 may be a mobile phone, a computer, a digital broadcast terminal, a messaging device, a gaming console, a tablet, a medical device, exercise equipment, a personal digital assistant, and the like.

Referring to FIG. 8, the main device 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the main device 800, such as the operations associated with display, telephone calls, data communications, camera operations, and recording operations. The processing component 802 may include one or more processors 820 to execute instructions to perform all or part of the steps in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the main device 800. Examples of such data include instructions for any applications or methods operated on the main device 800, contact data, phonebook data, messages, pictures, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the main device 800. The power component 806 may include a power management system, one or more power sources, and any other components associated with the generation, management, and distribution of power in the main device 800.

The multimedia component 808 includes a screen providing an output interface between the main device 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. The front camera and the rear camera may receive an external multimedia datum while the main device 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone ("MIC") configured to receive an external audio signal when the main device 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the main device 800. For instance, the sensor component 814 may detect an open/closed status of the main device 800, relative positioning of components, e.g., the display and the keypad, of the main device 800, a change in position of the main device 800 or a component of the main device 800, a presence or absence of user contact with the main device 800, an orientation or an acceleration/deceleration of the main device 800, and a change in temperature of the main device 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the main device 800 and other devices. The main device 800 can access a wireless network based on a communication standard, such as WiFi, 2G, or 3G, or a combination thereof. In one exemplary embodiment, the communication component 816 receives a broadcast signal or broadcast associated information from an external broadcast management system via a broadcast channel. In one exemplary embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the main device 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 804, executable by the processor 820 in the main device 800, for performing the above-described methods. For example, the non-transitory computer-readable storage medium may be a ROM, a RAM, a CD-ROM, a magnetic tape, a floppy disc, an optical data storage device, and the like.

A non-transitory computer readable storage medium, when instructions in the storage medium are executed by the processor of the main device, causes the main device to perform a method for configuring photographing parameters. The method includes: acquiring photographing parameters, which include at least an output color temperature and an output time, for configuring a supplemental device with a flashlight component capable of adjusting color temperature according to a currently set photographing mode; and transmitting the photographing parameters to the supplemental device through a wireless data network, such that the supplemental device sets an output color temperature and an output time of the flashlight component in the supplemental device according to the photographing parameters when photographing.

In the embodiments of the present disclosure, by acquiring a color temperature and an output time in photographing parameters for configuring the supplemental device, an output color temperature and an output time of the flashlight component in the supplemental device are controlled, thus the accuracy of the output color temperature of the supplemental device, which supplements light during photographing using multiple terminal devices, is improved, and the quality of the photograph captured is also improved.

Figure 9:
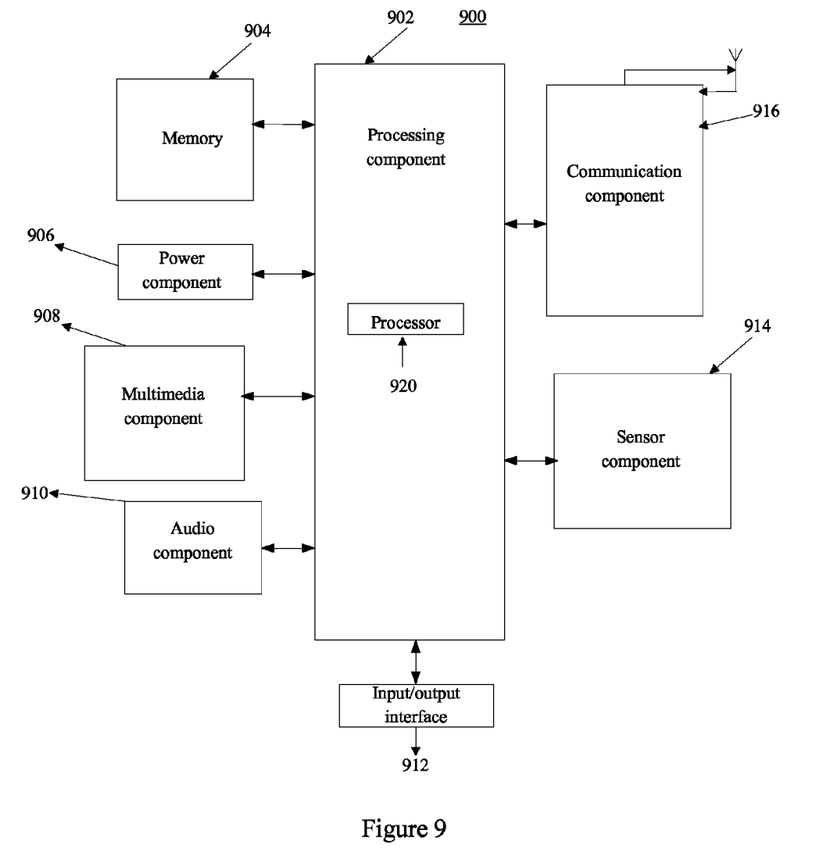
FIG. 9 is a block diagram showing a supplemental device to an exemplary embodiment of the present disclosure.

The embodiments of the present disclosure provides a supplemental device as shown in FIG. 9, which is a block diagram showing a supplemental device according to an exemplary embodiment. For example, the supplemental device 900 may be a mobile phone, a computer, a digital broadcast terminal, a messaging device, a gaming console, a tablet, a medical device, exercise equipment, a personal digital assistant, and the like.

Referring to FIG. 9, the supplemental device 900 may include one or more of the following components: a processing component 902, a memory 904, a power component 906, a multimedia component 908, an audio component 910, an input/output (I/O) interface 912, a sensor component 914, and a communication component 916.

The processing component 902 typically controls overall operations of the supplemental device 900, such as the operations associated with display, telephone calls, data communications, camera operations, and recording operations. The processing component 902 may include one or more processors 920 to execute instructions to perform all or part of the steps in the above described methods. Moreover, the processing component 902 may include one or more modules which facilitate the interaction between the processing component 902 and other components. For instance, the processing component 902 may include a multimedia module to facilitate the interaction between the multimedia component 908 and the processing component 902.

The memory 904 is configured to store various types of data to support the operation of the supplemental device 900. Examples of such data include instructions for any applications or methods operated on the supplemental device 900, contact data, phonebook data, messages, pictures, video, etc. The memory 904 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 906 provides power to various components of the supplemental device 900. The power component 906 may include a power management system, one or more power sources, and any other components associated with the generation, management, and distribution of power in the supplemental device 900.

The multimedia component 908 includes a screen providing an output interface between the supplemental device 900 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 908 includes a front camera and/or a rear camera. The front camera and the rear camera may receive an external multimedia datum while the supplemental device 900 is in an operation mode, such as a photographing mode or a video mode. Each of the front camera and the rear camera may be a fixed optical lens system or have focus and optical zoom capability.

The audio component 910 is configured to output and/or input audio signals. For example, the audio component 910 includes a microphone ("MIC") configured to receive an external audio signal when the supplemental device 900 is in an operation mode, such as a call mode, a recording mode, and a voice recognition mode. The received audio signal may be further stored in the memory 904 or transmitted via the communication component 916. In some embodiments, the audio component 910 further includes a speaker to output audio signals.

The I/O interface 912 provides an interface between the processing component 902 and peripheral interface modules, such as a keyboard, a click wheel, buttons, and the like.

The buttons may include, but are not limited to, a home button, a volume button, a starting button, and a locking button.

The sensor component 914 includes one or more sensors to provide status assessments of various aspects of the supplemental device 900. For instance, the sensor component 914 may detect an open/closed status of the supplemental device 900, relative positioning of components, e.g., the display and the keypad, of the supplemental device 900, a change in position of the supplemental device 900 or a component of the terminal device 900, a presence or absence of user contact with the supplemental device 900, an orientation or an acceleration/deceleration of the supplemental device 900, and a change in temperature of the supplemental device 900. The sensor component 914 may include a proximity sensor configured to detect the presence of nearby objects without any physical contact. The sensor component 914 may also include a light sensor, such as a CMOS or CCD image sensor, for use in imaging applications. In some embodiments, the sensor component 914 may also include an accelerometer sensor, a gyroscope sensor, a magnetic sensor, a pressure sensor, or a temperature sensor.

The communication component 916 is configured to facilitate communication, wired or wirelessly, between the supplemental device 900 and other devices. The supplemental device 900 can access a wireless network based on a communication standard, such as WiFi, 2G, or 3G, or a combination thereof. In one exemplary embodiment, the communication component 916 receives a broadcast signal or broadcast associated information from an external broadcast management system via a broadcast channel. In one exemplary embodiment, the communication component 916 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the supplemental device 900 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 904, executable by the processor 920 in the supplemental device 900, for performing the above-described methods. For example, the non-transitory computer-readable storage medium may be a ROM, a RAM, a CD-ROM, a magnetic tape, a floppy disc, an optical data storage device, and the like.

A non-transitory computer readable storage medium, when instructions in the storage medium are executed by the processor of the supplemental device, causes the supplemental device to perform a method for configuring photographing parameters. The method includes: receiving photographing parameters, which include at least an output color temperature and an output time, transmitted from a main device; and setting an output color temperature and an output time for photographing of a flashlight component according to the photographing parameters.

In the embodiments of the present disclosure, by acquiring a color temperature and an output time in photographing parameters for configuring the supplemental device, an output color temperature and an output time of the flashlight component in the supplemental device are controlled, thus the accuracy of the output color temperature of the supplemental device, which supplements light during photographing using multiple terminal devices, is improved, and the quality of the photograph captured is also improved.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and concept of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for configuring photographing parameters in a main device, comprising:
   acquiring photographing parameters, which include at least an output color temperature and an output time, for configuring a supplemental device with a flashlight component capable of adjusting color temperature according to a currently set photographing mode; wherein acquiring the photographing parameters comprises:
   acquiring a first color temperature value if the currently set photographing mode is a first photographing mode;
   obtaining a second color temperature value if the currently set photographing mode is a second photographing mode;
   receiving a third color temperature value reported by the supplemental device;
   acquiring a currently set shutter time if the currently set photographing mode is a third photographing mode;
   averaging third color temperature values reported from each of additional supplemental devices to obtain a fourth color temperature value, if two or more additional supplemental devices report the third color temperature values;
   setting the fourth color temperature value as the output color temperature of the flashlight component in each of the additional supplemental devices;
   setting the shutter time as the output time for configuring the flashlight component in the supplemental device; and
   transmitting the photographing parameters to the supplemental device through a wireless data network, such that the supplemental device sets an output color temperature and an output time of the flashlight component in the supplemental device according to the photographing parameters when photographing.

2. The method according to claim 1, wherein acquiring the photographing parameters comprises:
   acquiring the first color temperature value currently set by a user and a currently set shutter time;
   setting the first color temperature value as the output color temperature for configuring the flashlight component in the supplemental device; and setting the shutter time as the output time for configuring the flashlight component in the supplemental device.

3. The method according to claim 1, wherein acquiring the photographing parameters comprises:
   detecting a color temperature of current environment to obtain the second color temperature value, and to acquire a currently set shutter time;
   setting the second color temperature value as the output color temperature for configuring the flashlight component in the supplemental device; and
   setting the shutter time as the output time for configuring the flashlight component in the supplemental device.

4. The method according to claim 1, wherein before acquiring the photographing parameters, the method further comprises:
   transmitting a detection instruction to the supplemental device through the wireless data network; and
   receiving the third color temperature value reported by the supplemental device according to the detection instruction, wherein the third color temperature value is obtained by detecting a color temperature of current environment by the supplemental device.

5. A method for configuring photographing parameters in a supplemental device, comprising:
   receiving photographing parameters, which include at least an output color temperature and an output time, transmitted from a main device;
   setting an output color temperature and an output time for photographing of a flashlight component according to the photographing parameters;
   wherein the received photographing parameters are acquired by the main device performing the following steps:
   acquiring a first color temperature value if the currently set photographing mode is a first photographing mode;
   obtaining a second color temperature value if the currently set photographing mode is a second photographing mode;
   receiving a third color temperature value reported by the supplemental device;
   acquiring a currently set shutter time if a currently set photographing mode is a third photographing mode;
   averaging third color temperature values reported from each of additional supplemental devices to obtain a fourth color temperature value, if two or more additional supplemental devices report the third color temperature values;
   setting the fourth color temperature value as the output color temperature of the flashlight component in each of the additional supplemental devices;
   setting the shutter time as the output time for configuring the flashlight component in the supplemental device; and
   transmitting the photographing parameters to the supplemental device through a wireless data network, such that the supplemental device sets an output color temperature and an output time of the flashlight component in the supplemental device according to the photographing parameters when photographing.

6. The method according to claim 5, wherein before receiving the photographing parameters from the main device, the method further comprises:
   receiving a detection instruction sent from the main device;
   detecting a color temperature of current environment according to the detection instruction; and
   returning the detected color temperature of the current environment to the main device.

7. A main device for configuring photographing parameters, comprising:
   a processor;
   a memory for storing instructions executable by the processor, wherein the processor is configured to perform:
   acquiring photographing parameters, which include at least an output color temperature and an output time, for configuring a supplemental device with a flashlight component capable of adjusting color temperature according to a currently set photographing mode;
   wherein acquiring the photographing parameters comprises:
   acquiring a first color temperature value if the currently set photographing mode is a first photographing mode;
   obtaining a second color temperature value if the currently set photographing mode is a second photographing mode;
   receiving a third color temperature value reported by the supplemental device;
   acquiring a currently set shutter time if the currently set photographing mode is a third photographing mode;
   averaging third color temperature values reported from each of additional supplemental devices to obtain a fourth color temperature value, if two or more additional supplemental devices report the third color temperature values;
   setting the fourth color temperature value as the output color temperature of the flashlight component in each of the additional supplemental devices;
   setting the shutter time as the output time for configuring the flashlight component in the supplemental device; and
   transmitting the photographing parameters to the supplemental device through a wireless data network, such that the supplemental device sets an output color temperature and an output time of the flashlight component in the supplemental device according to the photographing parameters when photographing.

8. The main device according to claim 7, wherein acquiring the photographing parameters comprises:
   acquiring the first color temperature value currently set by a user and a currently set shutter time;
   setting the first color temperature value as the output color temperature for configuring the flashlight component in the supplemental device; and
   setting the shutter time as the output time for configuring the flashlight component in the supplemental device.

9. The main device according to claim 7, wherein acquiring the photographing parameters comprises:
   detecting a color temperature of current environment to obtain the second color temperature value, and to acquire a currently set shutter time;
   setting the second color temperature value as the output color temperature for configuring the flashlight component in the supplemental device; and
   setting the shutter time as the output time for configuring the flashlight component in the supplemental device.

10. The main device according to claim 7, wherein before acquiring the photographing parameters, the processor is configured to further perform:
    transmitting a detection instruction to the supplemental device through the wireless data network; and
    receiving the third color temperature value reported by the supplemental device according to the detection instruction, wherein the third color temperature value is obtained by detecting a color temperature of current environment by the supplemental device.

11. A supplemental device for configuring photographing parameters, comprising:
a processor;
a memory for storing instructions executable by the processor, wherein the processor is configured to perform:
receiving photographing parameters, which include at least an output color temperature and an output time, transmitted from a main device;
setting an output color temperature and an output time for photographing of a flashlight component according to the photographing parameters;
wherein the received photographing parameters are acquired by the main device configured to perform:
acquiring a first color temperature value if the currently set photographing mode is a first photographing mode;
obtaining a second color temperature value if the currently set photographing mode is a second photographing mode;
receiving a third color temperature value reported by the supplemental device;
acquiring a currently set shutter time if a currently set photographing mode is a third photographing mode;
averaging third color temperature values reported from each of additional supplemental devices to obtain a fourth color temperature value, if two or more additional supplemental devices report the third color temperature values;
setting the fourth color temperature value as the output color temperature of the flashlight component in each of the additional supplemental devices;
setting the shutter time as the output time for configuring the flashlight component in the supplemental device; and
transmitting the photographing parameters to the supplemental device through a wireless data network, such that the supplemental device sets an output color temperature and an output time of the flashlight component in the supplemental device according to the photographing parameters when photographing.

12. The supplemental device according to claim 11, wherein before receiving the photographing parameters from the main device, the processor is configured to further perform:
receiving a detection instruction sent from the main device;
detecting a color temperature of current environment according to the detection instruction; and
returning the detected color temperature of the current environment to the main device.

* * * * *